United States Patent [19]
Bull et al.

[11] Patent Number: 5,505,895
[45] Date of Patent: Apr. 9, 1996

[54] PROCESS FOR MAKING MOULDED ARTICLES OF EPOXY RESIN COMPOSITIONS

[75] Inventors: Christopher H. Bull, Trumpington; Philip D. Willis, Stortford; Richard J. Martin, Cambridge, all of England

[73] Assignee: Ciba-Geigy Corporation, Tarrytown, N.Y.

[21] Appl. No.: 166,749

[22] Filed: Dec. 14, 1993

[30] Foreign Application Priority Data

Dec. 19, 1992 [GB] United Kingdom ............... 9226500

[51] Int. Cl.$^6$ .................................................. B29C 45/73
[52] U.S. Cl. ............... 264/327; 264/328.13; 264/331.12; 523/458; 523/466; 525/533
[58] Field of Search ........................... 264/327, 328.13, 264/331.12; 523/458, 466; 525/533

[56] References Cited

U.S. PATENT DOCUMENTS

| | | | |
|---|---|---|---|
| 2,947,717 | 8/1960 | Belanger | 525/533 |
| 3,954,712 | 5/1976 | Lottanti | 525/533 |

FOREIGN PATENT DOCUMENTS

| | | | |
|---|---|---|---|
| 333456 | 9/1989 | European Pat. Off. | |
| 140220 | 8/1984 | Japan | 525/533 |
| 1323343 | 7/1973 | United Kingdom | |

OTHER PUBLICATIONS

H. Lee & K. Neville, "Handbook of Epoxy Resins", McGraw-Hill Book Co., New York, pp. 12/35–12/36 (1982-Reissue).

*Primary Examiner*—John C. Bleutge
*Assistant Examiner*—D. R. Wilson
*Attorney, Agent, or Firm*—William A. Teoli, Jr.

[57] ABSTRACT

A process for making a cured plastics moulding by introducing a pre-heated curable resin composition to a hotter mould which is at a temperature high enough to initiate curing of the resin, and supplying further resin under pressure to compensate for shrinkage of the composition wherein the curable resin is a formulation comprising an aromatic glycidyl ether epoxy resin, an inert filler, a quaternary ammonium or phosphonium salt as accelerator, 0.5–1.2 mol per mol epoxy of a saturated cycloaliphatic anhydride and a polycarboxylic acid preferably derived from the reaction of a polyol, this acid being present at a level of 0.05–0.5 mol carboxyl per mol epoxy.

8 Claims, No Drawings

PROCESS FOR MAKING MOULDED ARTICLES OF EPOXY RESIN COMPOSITIONS

The present invention relates to the use of curable compositions containing an epoxy resin for making moulded articles.

Epoxy resins can be used to make moulded articles by what is called the Automatic Pressure Gelation Process (APG). In this process which is described for example in GB 1323343 and EP 0333456 an epoxy resin and a curing agent are mixed at a temperature at which they are liquid, usually 40°–60° C. The mixture is then passed, under slight pressure, into a mould which is at a high enough temperature for gelling and curing to take place. Further mixture is supplied to the mould under the application of pressure to compensate for shrinkage of the composition until the composition has set.

Depending on whether a thick-walled or thin-walled casting is being made the technique is slightly different. In order to produce a thick-walled cured plastics moulding a pre-heated liquid casting resin composition which is capable of setting within a period of three to sixty minutes is injected under minimal pressure into a preheated mould so as substantially to fill the mould, the temperature of the mould being sufficient to initiate curing of the resin composition and the temperature of the composition being at least 10% below the temperature of the mould, said temperatures being measured in degrees centigrade, the temperature of the mould and the temperature of the resin composition being selected such that the temperature in the centre of the moulding composition will not reach the temperature of the composition at the mould wall until the composition has set sufficiently to enable it to be removed from the mould, and further composition is supplied to the mould with the application of pressure for compensating for shrinkage of the composition until the composition has set, whereafter the set moulding is removed from the mould.

In order to produce a thin-walled cured plastics moulding a pre-heated and de-gassed resin composition capable of setting within sixty minutes is supplied under pressure to a mould cavity of the shape of the moulding in a hotter pre-heated mould so as substantially to fill the mould cavity, gases are exhausted from the mould cavity as it is filled and are restrained from entering into the mould cavity during setting of the composition, and further composition is supplied under pressure to the mould cavity until the composition has set so as to compensate for shrinking of the composition, wherein the composition is pre-heated to a temperature of 50°–120° C. and is supplied to the mould cavity under a pressure of at least 28 kPa (4 psi), the maximum temperature of the mould cavity is 170°–200° C. and the temperature of the mould is controlled to maintain a continuous temperature gradient in the composition with the lowest temperature at the point of entry for the composition into the mould cavity and the highest temperature at the peripheral regions of the cavity remote from the entry, whereby setting of the composition progresses through the mould cavity from locations remote from the entry back to the entry.

It is generally accepted that cured aromatic glycidyl ether epoxy resins are affected by sunlight and ultra-violet irradiation. The adverse effects produced are primarily chalking and/or discoloration. Numerous measures have been proposed to improve the performance.

Special non-aromatic epoxy resins have been used as alternatives, for example cycloaliphatic resins in outdoor electrical insulators, and triglycidyl isocyanurate in weather resistant coating powders. Alternatively, use is made of special additives such as anti-oxidants and UV stabilisers.

When cycloaliphatic resins are employed with anhydride hardeners it is accepted that the maximum level of UV stability is achieved if the hardener too is fully saturated.

We have now surprisingly found that saturated alicyclic anhydride hardeners yield cured products with bisphenol A epoxy resins which exhibit much greater resistance to yellowing under sunlight than do hardeners with double bond unsaturation. This yellowing resistance can be still further improved by the incorporation of antioxidants and UV stabilisers.

Curable compositions based on liquid bisphenol epoxy resins with saturated cycloaliphatic anhydride hardeners are commonly used, especially in casting technology. However, for processes involving rapid cure at high temperatures, such as the casting of thin walled components by the APG process, the standard saturated cycloaliphatic anhydrides suffer from a serious disadvantage i.e. their tendency to undergo base catalysed intermolecular condensation with the elimination of carbon dioxide gas. This by-reaction during the polymerisation of the resin leads to the formation of bubbles in the cured product.

We have found that this effect can be greatly reduced by the incorporation of a carboxylic acid moiety or an aliphatic hydroxy compound, the latter being capable of yielding an acid by in-situ reaction with the anhydride. This allows a large measure of control over carbon dioxide evolution. Additionally we have found that the carbon dioxide evolution may be further controlled by means of free radical scavengers such as hindered phenols and hindered amines.

A further constraint on the use, for fast cycle APG processes, of systems based on epoxy resins cured with saturated anhydride hardeners containing carboxylic acid modifiers and containing conventional tertiary amine or imidazole accelerators is the slow rate of development of initial cure which adversely affects time to demould and hence the overall process economics. We have found that the initial cure can be substantially accelerated without serious sacrifice of the usable life of the mixture by the inclusion of suitable quaternary ammonium or phosphonium salts as accelerators or co-accelerators.

Accordingly, the present invention provides a process for making a cured plastics moulding by introducing a pre-heated curable resin composition to a hotter mould which is at a temperature high enough to initiate curing of the resin, and supplying further resin under pressure to compensate for shrinkage of the composition wherein the curable resin is a formulation comprising an aromatic glycidyl ether epoxy resin, an inert filler, a quaternary ammonium or phosphonium salt as accelerator, 0.5–1.2 tool per mol epoxy of a saturated cycloaliphatic anhydride and a polycarboxylic acid (preferably derived from the reaction of a polyol), this acid being present at a level of 0.05–0.5 mol carboxyl per mol epoxy.

The acid functional component may be added as a separate component, and/or may be formed in the hardener component by prior condensation with a sub-stoichiometric quantity of the polyol, and/or may be formed during or after the resin/hardener mixing stage from polyol previously incorporated in the resin or added with the resin-hardener mixture as a separate component.

Preferably 0.5–0.85 mol of anhydride and 0.1–0.25 mol of acid are present per mol of epoxy.

The total level of filler may be from 40–85% by weight of the composition, preferably from 50–80% by weight.

Suitable epoxy resins are polyglycidyl and poly(beta-methylglycidyl)ethers obtainable by reaction of a compound containing at least two free phenolic hydroxyl groups per molecule with the appropriate epichlorohydrin under alkaline conditions or, alternatively, in the presence of an acidic catalyst and subsequent treatment with alkali. These ethers may be made from mononuclear phenols, such as resorcinol and hydroquinone, and from polynuclear phenols, such as bis(4-hydroxyphenyl)methane, 4,4'-dihydroxydiphenyl, 1,1,2,2-tetrakis(4-hydroxyphenyl)ethane, 2,2-bis(4-hydroxyphenyl)-propane and 2,2-bis(3,5-dibromo-4-hydroxyphenyl)propane. Preferably the epoxy resin is a glycidyl ether of 2,2-bis(4-hydroxyphenyl)-propane.

The saturated acid anhydride is preferably a saturated cyclic anhydride such as hexahydrophthalic anhydride and methylhexahydrophthalic anhydrides, or mixtures thereof. The saturated anhydride may contain up to 20% by weight of unsaturated anhydride.

Any of a wide range of polyols may be used, both aliphatic and cyclic. Examples of suitable compounds include ethylene glycol, 1,2-propylene glycol, 1,3-propylene glycol, butane-1,4-diol, butane-1,3-diol, trimethylolpropane, glycerol, neopentyl glycol, pentaerythritol, polyethylene glycols and polypropylene glycols having a molecular weight up to 1000, and hydrogenated bisphenol A.

Suitable quaternary ammonium and phosphonium compounds include halides and acetates such as tetramethylammonium chloride, tetraethylammonium chloride, benzyltrimethylammonium chloride, dodecylbenzyldiethylammonium chloride, tetramethylammonium acetate, tetrabutylphosphonium chloride, and ethyltriphenylphosphonium chloride.

The amount of accelerator may be up to 5 parts by weight, preferably 0.2 to 0.8 parts by weight, per 100 parts by weight of liquid epoxy resin.

Additional accelerators may also be present. Examples include tertiary amines or imidazoles and salts thereof with phenols or acids, alkyldimethylamine-boron trichloride complexes, zinc octoate, stannous octoate and alkali metal alkoxides.

The composition may also contain an antioxidant.

Examples of suitable antioxidants include alkylated monophenols, alkylthiomethylphenols, hydroquinones and alkylated hydroquinones, hydroxylated thiodiphenyl ethers, alkylidenebisphenols, O-, N- and S-benzyl compounds, hydroxybenzylated malonates, hydroxybenzyl aromatics, triazine compounds, benzylphosphonates, acylaminophenols, esters and amides of β-(3,5-di-tert-butyl-4-hydroxyphenyl)propionic acid, esters of β-(5-tert-butyl-4-hydroxy-3-methylphenyl)propionic acid, esters of β-(3,5-dicyclohexyl-4-hydroxyphenyl)propionic acid, esters of 3,5-di-tert-butyl-4-hydroxyphenyl acetic acid, and esters of 3,3-bis(3$^1$-tert-butyl, 4$^1$-hydroxyphenyl) butyric acid.

The antioxidant may be used in conjunction with one or more UV absorbers and light stabilisers. Examples of suitable UV absorbers and light stabilisers are 2-(2$^1$-hydroxyphenyl)benzotriazoles, 2-hydroxybenzophenones, esters of substituted and unsubstituted benzoic acids, cyanoacrylates, nickel compounds, sterically hindered amines, oxalic acid diamides and 2-(2-hydroxyphenyl)- 1,3,5-triazines A wide range of fillers may be used, both fine and coarse particles. The filler may be inorganic such as china clay, calcined china clay, quartz flour, cristobalite, chalk, mica powder, glass powder, glass beads, powdered glass fibre, aluminium oxide, wollastonite and magnesium hydroxide, or organic such as powdered poly(vinyl chloride), nylon, polyethylene, polyester or cured epoxy resin. Flame retardant fillers such as trihydrated alumina may also be used.

Mixtures of fillers may be used. For example in order to give a granite-like effect in a moulded product a mixture of calcined china clay and black mica of relatively large particle size may be used, for instance about 0.5 mm.

The filler may also have its surface treated with a silane or organotitanate coupling agent.

In general fillers having a particle size of from 10 to 3,000 microns may be used, preferably from 50 to 700 microns.

The composition may be provided in two or more parts, one containing the epoxy resin and one containing the acid anhydride.

The antioxidant may be present in either part, but is preferably with the acid anhydride in the anhydride part.

The filler is preferably in the epoxy part as the viscosity is high enough to prevent any setting of the filler. It is also possible for some or all of the filler to be present in the acid anhydride part.

The accelerator may be present in either part, providing that the level in the resin part is not sufficient to render the mixture unacceptably unstable.

Other additives conventionally employed in moulding resin compositions may also be included in the composition. Examples of such additives are pigments, dyes, fibres such as glass and carbon fibres, flame retardants, surfactants, anti-foaming agents, toughening agents such as rubbers and core-shell polymers, and other stabilisers such as lower carboxylic acids.

In order to cure the composition, the ingredients are all mixed together and then passed to a mould which is at a high enough temperature to cure the composition, e.g. at a temperature of from 140° to 200° C.

The formulations used in the present invention allow the moulding process to be carried out at high temperatures of up to 200° C. without decarboxylation. This allows for fast production. The moulded products can also be demoulded easily because they soon become tough enough once the curing has started. The final moulded products also have very good toughness properties and have excellent UV stability.

The process of the invention may be used for the production of mouldings having thin or thick walls (cross sections). It is also particularly suitable for the production of mouldings having a large surface area, at least one large linear dimension or a complex shape. The process may be used, for instance, in the moulding of domestic sanitary ware such as sinks, baths, shower trays and basins, sheet slabstock for use in the production of articles such as domestic worktops, chemically resistant containers such as tanks and parts such as pumps, valves and pipes for handling corrosive fluids and impact-resistant mouldings for use in cars and other vehicles, and electrical applications.

The process of the invention overcomes the need for employing different techniques depending on whether thick or thin wailed castings are being made. This enables mouldings having both thick and thin sections to be made easily.

The invention is illustrated by the following Examples, in which parts are parts by weight.

| Materials Used in Examples | |
|---|---|
| Epoxy resin I: | = 29.3% liquid bis A epoxy resin, epoxy content 5.2 mol/kg |
| | 0.036% tetramethylamonium chloride |
| | 11.8% titanium dioxide |
| | 58.8% calcined china clay passing 200 mesh |
| | 0.14% Byk W935, a commercial surfactant |

-continued

| Materials Used in Examples | |
|---|---|
| Epoxy resin II: | = 27.6% liquid bisphenol A epoxy resin, epoxy content 5.2 mol/kg<br>0.033% tetramethylammonium chloride<br>70.8% silica flour passing 200 mesh<br>1.4% precipitated calcium carbonate<br>0.14% Byk W935 a commercial surfactant<br>85 ppm carbon black<br>1.0 ppm phthalocyanine blue |
| Epoxy resin III: | = 27.4% Liquid bisphenol A epoxy resin, epoxy content 5.2 mol/kg<br>0.033% tetramethylammonium chloride<br>71.2% silica flour passing 200 mesh<br>0.68% calcined china clay, 1–2 mm aggregate<br>0.54% hydrophobic colloidal silica<br>0.14% Byk W935, a commercial surfactant<br>38 ppm carbon black |
| Epoxy resin IV: | = 26.2% of liquid bisphenol A epoxy resin, epoxy content 5.35 mol/kg<br>64.3% of silica flour passing 200 mesh<br>9.2% of titanium dioxide, rutile<br>0.26% of Byk W 980, a commercial surfactant<br>0.63% of Byk A 501, a commercial air release agent<br>2.4 ppm phthalocyanine blue. |

Method: Simple mixture prepared by vacuum mixing at 65° C.

heated to 70° C. and the hardener added. With Hardeners A-H, 1 mole of anhydride per mole of epoxy is used irrespective of neo-pentyl-glycol content. Hardener J is used at 80 parts per hundred of liquid epoxy resin. The mixtures at 50° C. are stirred under vacuum then injected at 100–250 kPa pressure into the centre of the bottom edge of a two-part steel mould providing a shaped cavity of overall height 900 mm, width 600 mm and uniform thickness 0.6 mm having a capacity of about 5.6 liter. The temperatures of the mould are controllable such that the top of the mould remains substantially hotter than the bottom. Filling the mould takes about 1–2 min after which pressure is maintained until the resin mixture is cured sufficiently for the mould to be opened and the casting demoulded. The casting is then subjected to a post-cure of 2 hours at 135° C., free-standing in an air-circulatory oven.

EXAMPLE 1

Epoxy resin I and Epoxy resin II are processed with Hardeners A, B, C, F, G, H and K to yield bright white castings which were inspected for carbon dioxide bubble inclusions and checked for colour with a Minolta Chrommeter. They are then subjected to irradiation by artificial sunlight and the colour change monitored with time. The results are shown in Table 1.

| Hardeners - Compositions in parts by weight | A | B | C | D | E | F | G | H | J | K |
|---|---|---|---|---|---|---|---|---|---|---|
| Hexahydrophthalic anhydride | 57.4 | 57.4 | 57.4 | 57.4 | 57.4 | 57.4 | 57.4 | 57.4 | — | 49.6 |
| Methylhexahydrophthalic anhydride | 24.6 | 24.6 | 24.6 | 24.6 | 24.6 | 24.6 | 24.6 | 24.6 | — | 39.6 |
| Methyltetrahydrophthalic anhydride | — | — | — | — | — | — | — | — | 80.8 | 9.9 |
| Neopentyl glycol | 0 | 2 | 2.46 | 3.6 | 4.4 | 4.4 | 4.4 | 7.2 | — | 5.4 |
| Neo-pentylglycol bis-tetrahydrophthalate half-ester | — | — | — | — | — | — | — | — | 18.7 | — |
| Boron trichloride ocyldimethylamine complex (Accelerator M) | 0.5 | 0.5 | 0.5 | 0.5 | 0.5 | 0.5 | 0.5 | 0.5 | 0.5 | 0.58 |
| Benzyldimethylamine (Accelerator N) | — | — | — | — | — | — | — | — | 0.09 | — |
| Pentaerythrityl-tetrakis-3-(3-diter.tbutyl-4-hydroxyphenyl)-propionate (Antioxidant P) | 2 | 2 | 2 | 2 | 2 | — | — | 2 | 2 | — |
| Butyricacid 3,3-bis-(3-tert-butyl-4-hydroxyphenyl) ethylene ester (antioxidant Q) | — | — | — | — | — | 1.35 | — | — | — | — |
| Benzyltriethylammonium chloride | — | — | — | — | — | — | — | — | — | 0.3 |

Methods of preparation
A. Simple mixture. Antioxidant dissolved in anhydrides at 80° C., then Accelerator M dissolved in at 50° C.
B. Anhydrides heated to 120° C., neo-pentyl glycol added and reacted in at 120° C. for 2 hours. Antioxidant dissolved in at 80° C. then Acclerator M at 50° C.
C. Neo-pentylglycol and tetrahydrophthalic anhydride, in 1:2 molar ratio, and Accelerator N combined at 120° C. then reacted 1 hour at 150° C. Antioxidant dissolved in at 80° C. and Accelerator M at 50° C.

Casting method The formulated epoxy resin component is

TABLE 1

| | | | Mould Temp °C. | | Minimum demould time | Bubble content | Time in days for yellow index ('b value') to increase by:- | |
|---|---|---|---|---|---|---|---|---|
| Expt | Resin | Hardener | TOP MAX | BOTTOM MIN | minutes | | 1 UNIT | 3 UNITS |
| I | I | J | 190 | 160 | 10 | NIL | 8 | 12 |
| II | I | A | 190 | 147 | 10.5 | Significant | 23 | >120 |
| III | I | A | 170 | 127 | 17 | NIL | — | — |

TABLE 1-continued

| Expt | Resin | Hardener | Mould Temp °C. TOP MAX | Mould Temp °C. BOTTOM MIN | Minimum demould time minutes | Bubble content | Time in days for yellow index ('b value') to increase by:- 1 UNIT | Time in days for yellow index ('b value') to increase by:- 3 UNITS |
|---|---|---|---|---|---|---|---|---|
| IV | I | B | 190 | 147 | 9.0 | NIL | 23 | 75 |
| V | I | C | 187 | 156 | 9.5 | NIL | — | — |
| VI | I | F | 199 | 155 | 8 | NIL | — | — |
| VII | I | G | 199 | 155 | 8.5 | NIL | — | — |
| VIII | I | H | 190 | 147 | 10 | NIL | — | — |
| IX | IV | K | 170 | 150 | 9.5 | NIL | 25 | >40 |

Expt. (1) Demonstrates that rapid demould can be achieved without decarboxylation using an unsaturated hardener but the stability to sunlight is poor.
Expt. (II) Shows that satisfactory light stability can be achieved by using a saturated anhydride without modification with a carboxyl-containing moiety but that the product is susceptable to decarboxylation.
Expt. (III) Shows that the decarboxylation can be prevented by low mould temperatures but that the demould time is adversely extended.
Expt. (IV–IX) Show that satisfactory decarboxylation - resistance, light stability and cure rate can be achieved by the appropriate selection of composition. Line (VI) in particular, demonstrate the exceptional achievement of an 8 min demould time in a 10 kg casting.

EXAMPLE 2

Resins II and III are of very similar composition apart from the presence of a small amount of coarse inert aggregate in Resin III. Resin II is used with Hardener C and Resin III is used with Hardener F. The results are shown in Table 2.

TABLE 2

| Expt | Resin | Hardener | Mould Temp °C. top max | Mould Temp °C. bottom max | Minimum demould time - minutes | Bubble content |
|---|---|---|---|---|---|---|
| I | II | C | 191 | 157 | 10.5 | significant |
| II | II | C | 176 | 142 | 12.5 | slight |
| III | II | C | 169 | 144 | 13 | very slight |
| IV | III | F | 162 | 144 | 12 | nil |
| V | III | F | 170 | 154 | 10 | nil |
| VI | III | F | 180 | 164 | 8 | nil |

Comparison of Expt. IV-VI with Expts. I-III demonstrates the effectiveness of an increased carboxyl content on the suppresion of decarboxylation, thereby enabling rapid demoulding of components.

We claim:

1. A process for making a cured plastics moulding by introducing a pre-heated curable resin composition to a hotter mould which is at a temperature high enough to initiate curing of the resin, and supplying further resin under pressure to compensate for shrinkage of the composition until the composition has set, whereafter the set moulding is removed from the mold, wherein the curable resin is a formulation comprising an aromatic glycidyl ether epoxy resin derived form a compound containing at least two free phenolic hydroxyl groups, 45–85% by weight of an inert filler having a particle size of from 10–3000 microns, up to 5 parts by weight of a quaternary ammonium or phosphonium salt as accelerator per 100 pans of epoxy resin, 0.5–1.2 mol per mole epoxy of a saturated cycloaliphatic dicarboxylic anhydride and a polycarboxylic acid wherein the acid is present at a level of 0.05–0.5 mol carboxyl group per mol epoxy group, wherein the process is carried out at a moulding temperature of up to 200° C., and wherein a mold time of 13 minutes or less is achieved at 170° C.

2. A process as claimed in claim 1 in which 0.5 to 0.85 mol of the anhydride and 0.1 to 0.25 mol of the acid are present per one equivalent of epoxy resin.

3. A process as claimed in claim 1 in which the epoxy resin is a glycidyl ether of 2,2-bis(4-hydroxyphenyl)-propane.

4. A process as claimed in claim 1 in which the saturated cycloaliphatic anhydride is hexahydrophalic anhydride, a methyl-hexahydropthalic anhydride or a mixture thereof.

5. A process as claimed in claim 1 in which the saturated cycloaliphatic anhydride contains up to 20% by weight of unsaturated anhydride.

6. A process as claimed in claim 1 in which the acid is derived from the reaction of the cycloaliphatic anhydride with a polyol which is selected from the group consisting of ethylene glycol, 1,2-propylene glycol, 1,3-propylene glycol, butane-1,4-diol, butane-1,3-diol, trimethylolpropane, glycerol, neopentyl glycol, pentaerythritol, polyethylene glycols and polypropylene glycols having a molecular weight up to 1000, and hydrogenated bisphenol A.

7. A process as claimed in claim 1 in which the formulation also contains an antioxidant.

8. A process as claimed in claim 7 in which the antioxidant is selected from the group consisting of alkylated monophenols, alkylthiomethylphenols, hydroquinones, alkylated hydroquinones, hydroxylated thiodiphenyl ethers, alkylidenebisphenols, O-,N- and S-benzyl compounds, hydroxybenzylated malonates, hydroxybenzyl aromatics, triazine compounds, benzylphosphonates, acylaminophenols, esters and amides of β-(3,5-di-tert-butyl-4-hydroxyphenyl)propionic acid, esters of β-(5-tert-butyl-4-hydroxy-3-methylphenyl)propionic acid, esters of β-(3,5-dicyclohexyl-4-hydroxyphenyl)propionic acid and esters of 3,5-di-tert-butyl-4-hydroxyphenyl acetic acid.

* * * * *